March 10, 1964 O. L. DUPY 3,124,732
REVERSIBLE STEP MOTOR SWITCHING CIRCUIT
Filed Oct. 1, 1959 4 Sheets-Sheet 1

INVENTOR:
OLIN L. DUPY
BY:
Bean, Brooks, Buckley & Bean
ATTORNEYS.

INVENTOR:
OLIN L. DUPY
BY:
Bean, Brooks, Buckley & Bean,
ATTORNEYS.

March 10, 1964     O. L. DUPY     3,124,732
REVERSIBLE STEP MOTOR SWITCHING CIRCUIT
Filed Oct. 1, 1959     4 Sheets-Sheet 4

INVENTOR:
OLIN L. DUPY
BY:
Bean, Brooks, Buckley & Bean
ATTORNEYS.

United States Patent Office 3,124,732
Patented Mar. 10, 1964

3,124,732
REVERSIBLE STEP MOTOR SWITCHING CIRCUIT
Olin L. Dupy, West Los Angeles, Calif., assignor to Wiesner-Rapp Co., Inc., Buffalo, N.Y.
Filed Oct. 1, 1959, Ser. No. 843,739
11 Claims. (Cl. 318—138)

This invention relates to electronic control systems for translating sequentially received pulses into incremental mechanical movements. More particularly the invention relates to a control system having two inputs each designed to receive pulses, one input receiving forward-motion pulses and the other input alternatively receiving reverse-motion pulses, and the system translating the pulses into bidirectional movements of a mechanical actuator which movements depend upon the rate of pulse input and upon whether the pulses received are forward-motion pulses or reverse-motion pulses.

It is a primary object of this invention to provide a novel step-by-step control system including a stepping motor having at least three sequentially-energized windings. A motor of the general type herein referred to is described in expired U.S. Patent 1,440,729, wherein each time a different motor winding in the sequence is energized, the motor rotates one step through a small increment. The direction of rotation of the motor is determined by the sequential direction of energization of the windings. More particularly, the present system includes a reversible electronic counter circuit which counts forwardly and energizes the motor windings in forward-motion sequence in response to discrete pulses applied to the forward-motion input of the electronic counter, or, alternatively, the counter circuit counts in the reverse direction and energizes the motor windings in reverse-motion sequence in response to pulses applied to the reverse-motion input of the counter, the input pulses each advancing the motor one step in the appropriate direction. The electronic counter circuit thus serves as a commutating device for the windings of the stepping motor.

The particular electronic counter included for illustrative purposes in this disclosure includes an amplifier and a pulse-shaping trigger associated with each pulse input and amplifying and shaping the pulses received thereat. The stepping motor in the embodiment with reference to which this invention is specifically illustrated has four sequential windings and therefore a count-of-four electronic counter circuit must be provided. The circuit includes two bi-stable multivibrators, or flip-flops, which together have a total of four permutations of conductivity. The conductivity of one multivibrator is reversed directly by each pulse signal from either input, and a coincidence circuit is employed to reverse the conductivity of the second multivibrator every other time an input pulse is received. The four possible permutations of conductivity of the two multivibrators are then interpreted by a system of electronic switches which energize one motor winding at a time in accordance with whichever of the four possible permutations exists at that instant.

It is another important object of this invention to provide a novel coupling circuit for connecting each of the stepping motor windings to an output of the electronic counter circuit such that a higher voltage is applied across the winding at the beginning of its energization so as to cause the motor to move quickly and definitely to the new motor position, and whereby the voltage across the winding is then reduced to a lower steady-state value to maintain the motor in the newly-selected position.

Other objects and advantages will become apparent during the following discussion of the drawings, wherein:

FIG. 1 is a block diagram of input circuits feeding a reversible electronic counter to be controlled by forward-motion and reverse-motion pulses, the actual counter being shown enclosed in dashed lines.

FIGS. 2 and 3 when joined together at the terminals $a$, $b$, $c$, $d$, $e$ and $f$, form the schematic diagram of a practical embodiment of the circuits represented in block diagram form in FIG. 1.

*Electronic Circuitry*

Figure 1:
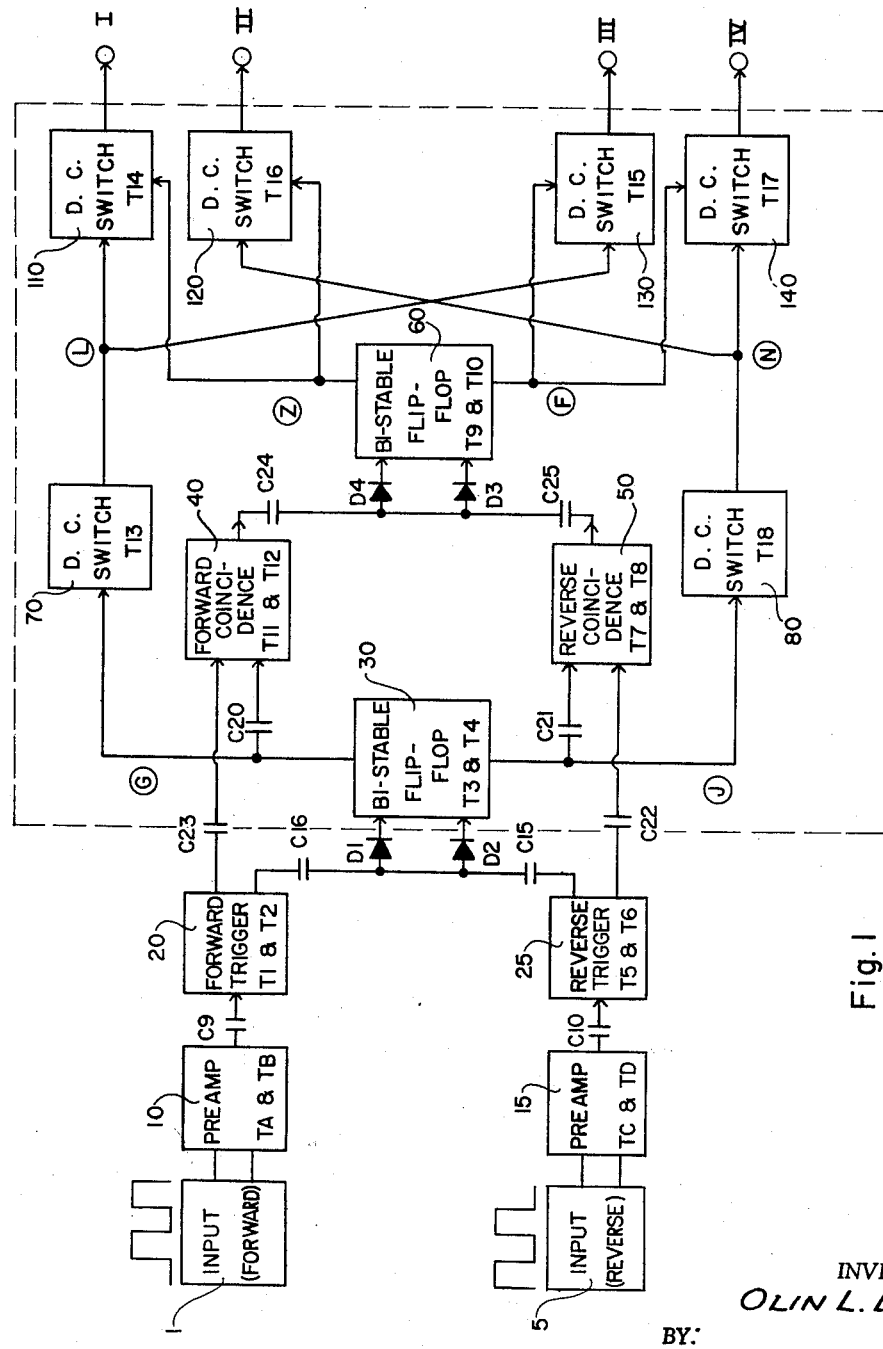
Figure 2:
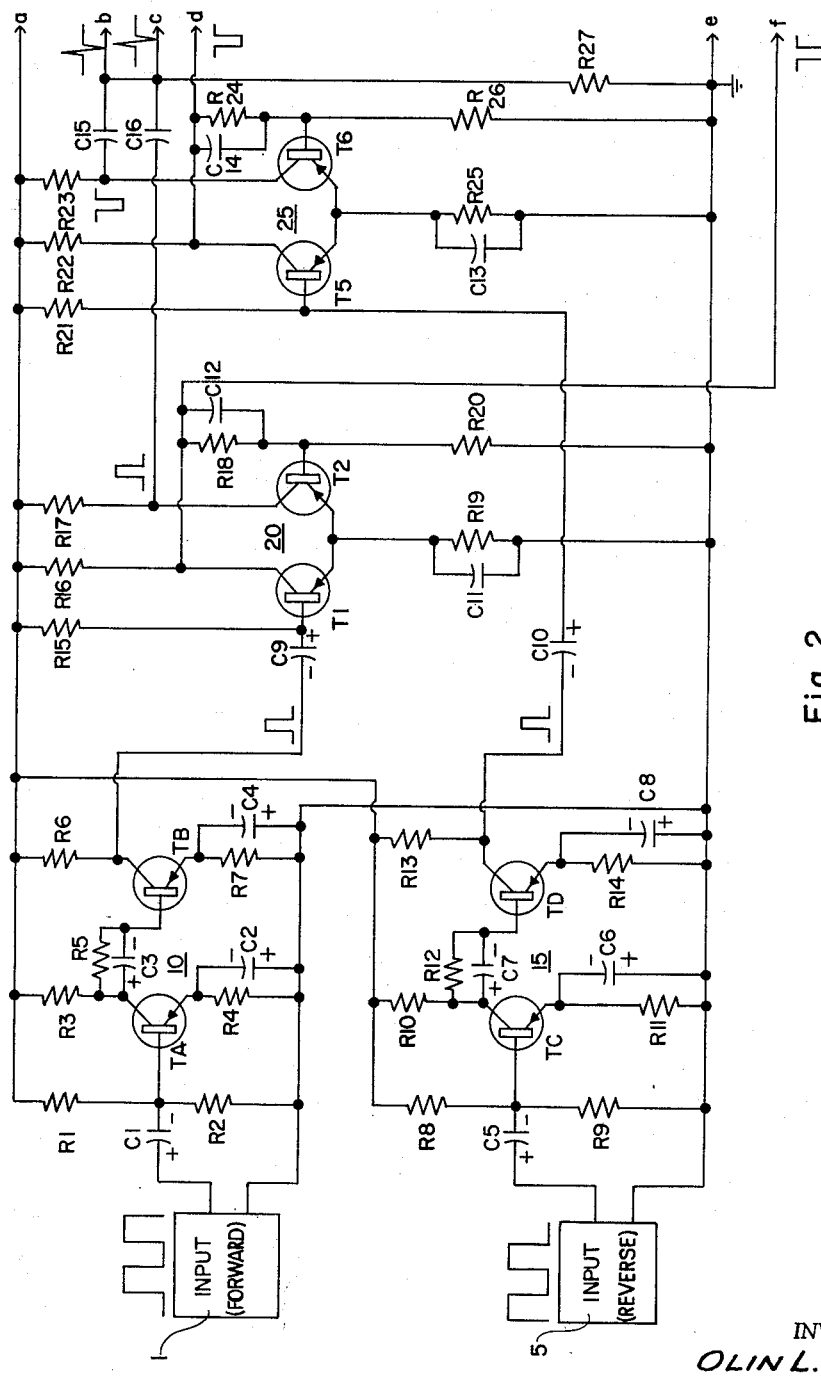

As stated in the general description of the invention, supra, and referring particularly to FIGS. 1 and 2, input signals are fed into separate inputs 1 and 5, said inputs being alternatively pulsed by wave forms as shown thereadjacent. The input 1 feeds into a preamplifier 10 which in turn feeds into a forward trigger circuit 20. The input 5 feeds into a similar preamplifier unit 15 which in turn feeds into a reverse trigger circuit 25. The trigger circuits 20 and 25 each deliver two different output signals in each case comprising simultaneous positive and negative pulses. One output from each of the trigger circuits 20 and 25 is fed in parallel with the similar output of the other trigger to a bistable multivibrator circuit 30, and this circuit likewise delivers two outputs, one positive and the other negative.

The other output from the forward triggers is fed to a forward coincidence circuit 40 which circuit also receives one of the outputs from the bi-stable multivibrator 30. Likewise, whenever there is an output from the reverse trigger unit 25, it is fed to a reverse coincidence circuit 50 to which the other output from the bistable multivibrator 30 is also connected. These coincidence circuits 40 and 50 do not function simultaneously, but each functions only upon receipt of a pulse at its associated input 1 or 5. These inputs are never energized simultaneously. The outputs of the two coincidence circuits 40 and 50 are connected together and simultaneously control the conductivity of another bi-stable multivibrator 60.

Th functioning of these bi-stable multivibrators and coincidence circuits will be presently described in detail, but in broad terms, the multivibrator 30 reverses its conductivity whenever a pulse is received at either input 1 or 5. However, the bi-stable multivibrator 60 reverses its conductivity only every alternate time the flip-flop 30 reverses. Therefore, there are four possible permutations of conductivity of the two multivibrators 30 and 60.

The block diagram of FIG. 1 also includes six electronic-switch means whose conductivities are controlled by the bi-stable multivibrators 30 and 60. The electronic switch 70 is connected to and controlled by one output of the multivibrator 30. The electronic switch 80 is connected to and controlled by the other output of the bi-stable multivibrator 30 and the switches 70 and 80 are so arranged that only one of them at a time is conductive. As stated above, the two outputs of the bi-stable multivibrator 30 are alternately positive and negative, and the electronic switches 70 and 80 are so arranged that only one of them at a time is rendered conductive by an output of the appropriate polarity of the multivibrator 30.

There are four other electronic switches 110, 120, 130 and 140, these switches each having two control terminals both of which must be energized before the switch is rendered conductive. One control terminal of the switch 110 is connected in parallel circuit at L, FIG. 1, with a similar control terminal of the switch 130 while the other control terminal of the switch 110 is connected in a parallel circuit at Z with the corresponding control terminal of the switch 120. Parallel circuit L is connected for control by the bi-stable multivibrator 30 through the electronic switch 70 and the other parallel circuit Z is connected for control by the other bi-stable multivibrator 60. Likewise, the electronic switch 140 has one of its terminals connected in a parallel circuit at N with a similar terminal of the electronic switch 120 and the other terminal of the switch 140 is connected in a parallel circuit at F with the corresponding terminal of the switch 130 and these two parallel circuits are respectively connected for control by the two bi-stable multivibrators 30 and 60. It is to be noted that the latter two parallel circuits are connected to different outputs of the bi-stable multivibrator 30 and 60 than the first-mentioned parallel circuits.

With the electronic switches 110, 120, 130 and 140 connected as shown in FIG. 1, only one of these switches will be conductive at any particular time, and the conductivity of the switches will depend on the permutations of conductivity of the multivibrators 30 and 60 respectively. Thus, of the four output terminals I, II, III and IV, only one will be selected at any particular instant of time. The particular circuits and the exact manner in which they operate will be described in greater detail in connection with FIGS. 2 and 3. However, for the purpose of completing a general description of the system, FIG. 4 will be described first.

Figure 3:
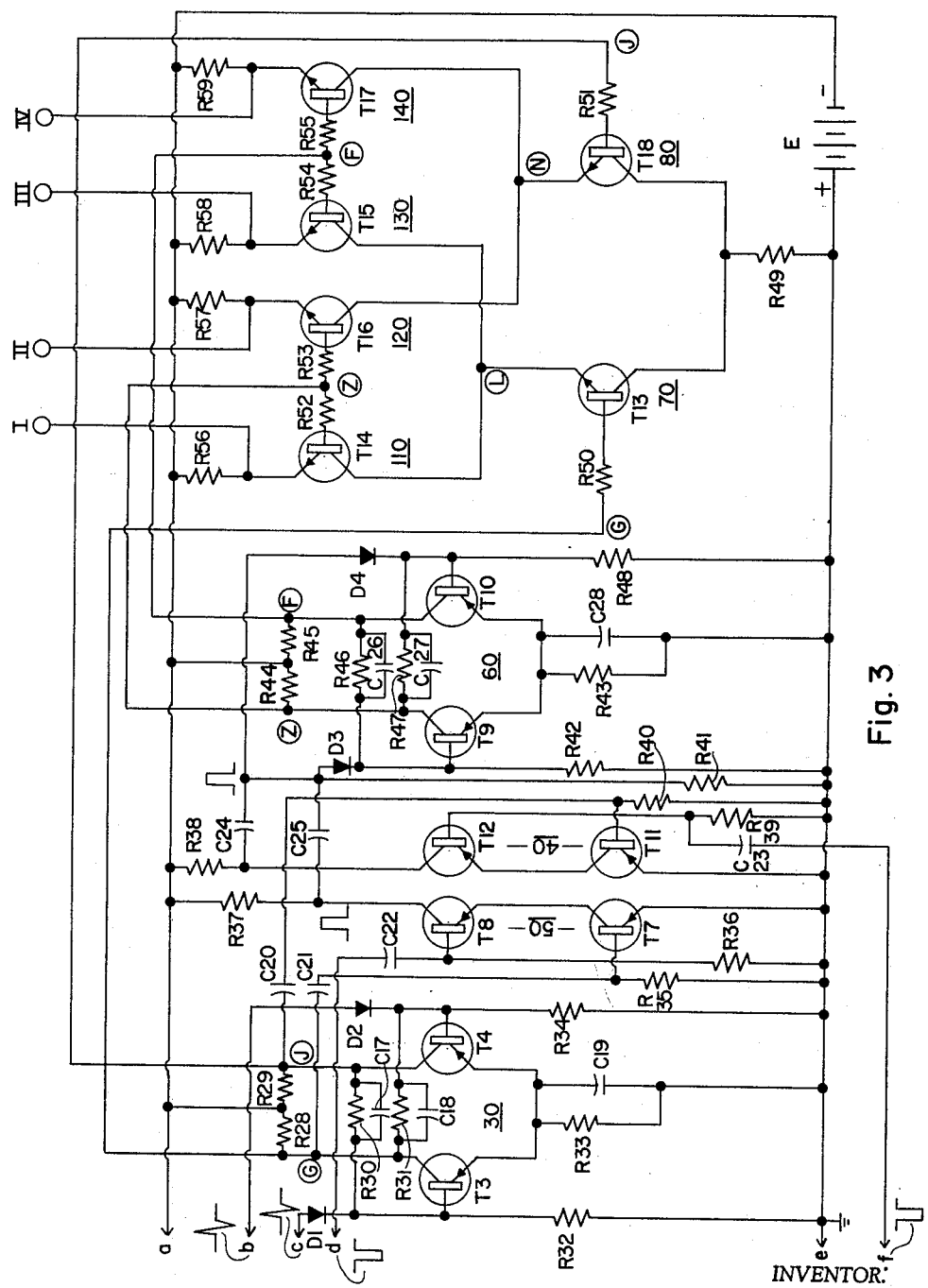
Figure 4:
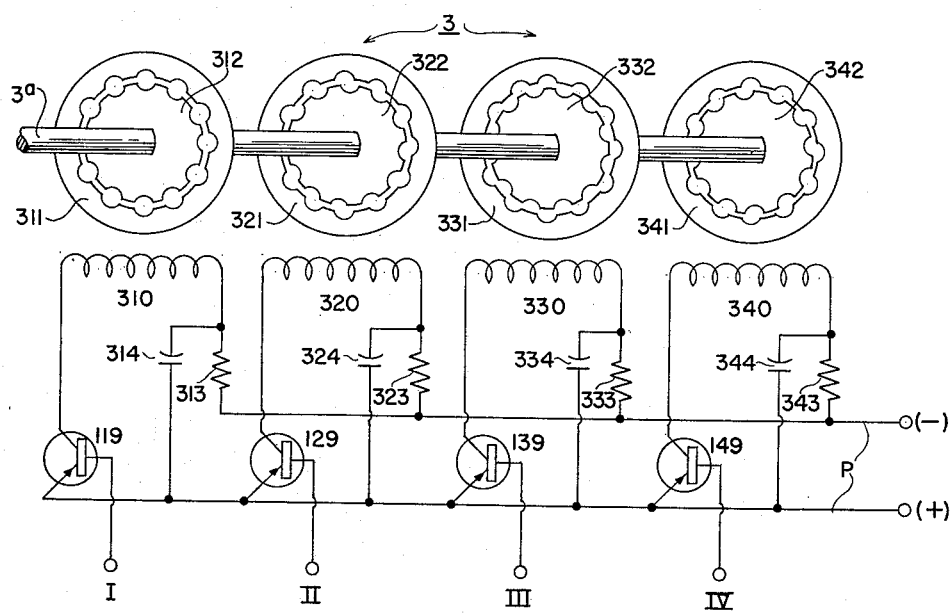
FIG. 4 is a schematic diagram representing a four-winding stepping motor energized by power controlled by transistor coupling circuits which are themselves controlled by the electronic counter shown in FIGS. 1, 2 and 3.

The output terminals I, II, III and IV in FIGS. 1 and 3 are connected to corresponding input terminals I, II, III and IV in FIG. 4. These latter terminals lead to the base electrodes of power transistors 119, 129, 139 and 149 which serve as coupling circuits and which control the flow of current from the power lines F to the windings 310, 320, 330 and 340 wound on the stators 311, 321, 331 and 341 of the stepping motor 3. A shaft 3a extends from the motor and carries rotor members 312, 322, 332 and 342. It is to be noted that the rotors and the stators are notched so as to form salient magnetic poles, and that the poles in the stators line up with the poles in the rotors only in one of the four sections of the motor at any instant of time. In this case the rotor poles 312 are shown as lined up with the stator poles 311 but the rotor poles 322, 332 and 342 are out of alignment therewith. The manner of operation of this type of motor is believed to be well known and will therefore not be described in detail. It is enough to say that the windings 310, 320, 330 and 340 are energized one at a time, in sequence, and that if the winding 310 is presently energized, transferring of the energization to the winding 320 will cause the motor to step in one direction of rotation so as to pull the teeth of the rotor 322 into alignment with the nearest teeth of the stator 321. Consequently, if the winding 340 is energized next after the winding 310, the rotor 342 will move in the opposite direction in order to align its poles with the nearest poles of the stator 341 and thereby move the motor one step in the opposite direction. Thus, it will be seen that the sequence in which the terminals I, II, III and IV are energized will control the direction of stepping of the motor 3 in the manner known in the prior art and described in expired Patent 1,440,729 referred to above.

In the coupling and control circuits of FIG. 4 the emitter-collector path of each of the power transistors 119, 129, 139 and 149 is connected in series with an associated motor winding 310, 320, 330 and 340 respectively, and controls the flow of current in the windings from the power line P. The resistance of the power transistor will be considered negligible when the latter is fully conductive. Resistors 313, 323, 333 and 343 are provided in series with the respective windings to limit the current through the transistors and windings to safe values under steady-state conditions, a considerable voltage drop appearing across the resistors at that time. The condensers 314, 324, 334 and 344 serve to boost the power to the windings when first energized by rendering one of the power transistors conductive. At this instant, each condenser is charged to the full voltage of the power line P so that when the associated power transistor becomes conductive an additional acceleration transient is sent from the condenser through the winding. Then as steady-state conditions are approached by the discharge of the condenser, the associated resistor limits the current by reducing the portion of the line voltage applied to the winding. When the power transistor is again cut off, the charge on the condenser builds up again to the full voltage across the power line P.

Figure 5:
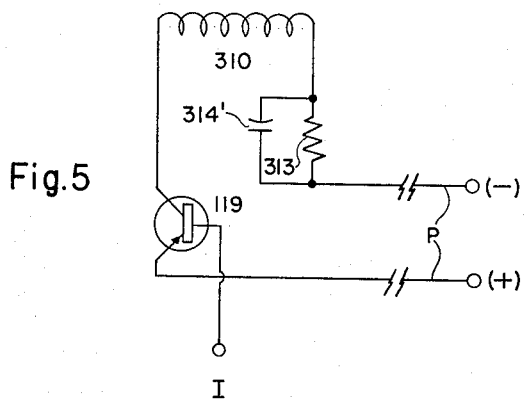
FIG. 5 is a schematic diagram of a modified transistor coupling circuit.

In the modified form shown in FIG. 5, when the power transistor 119 is cut off, the condenser 314′ is fully discharged. At the instant the transistor is rendered conductive, the condenser 314′ provides a low resistance path shunting resistance 313 until the condenser 314′ becomes charged up to the voltage drop which appears across the resistor under steady-state conditions. The above-mentioned low-resistance path initially provided by the condenser 314′ raises the voltage across the winding by shunting the resistor 313 and thereby impresses an accelerating charge on the winding 312 which subsequently reduces the safer value as limited by the resistor 313, the resistance of the transistor 119 being small in comparison therewith and therefore ignored herein. In all cases, the RC time constant of the resistance and the condenser must be less than the repetition rate of the stepping pulses for effective performance.

*Practical Embodiment*

In the description of the system with reference to the schematic diagram of FIGS. 2 and 3, the same units and circuit components will be designated by the same reference characters.

FIGS. 2 and 3 when read together show a practical embodiment of the electronic control circuit connected at one end to the inputs 2 and 5 and connected at the other end by the control terminals I, II, III and IV to the power transistors 119, 129, 139 and 149 in FIG. 4. The inputs are of a binary character comprising pulses received at only one of the inputs 1 and 5 at a time. Successive pulses picked up at the input 1 cause the terminals I, II, III and IV to be activated one at a time in ascending sequence of rotation. Conversely, similar successive pulses applied at the input 5 cause the terminals I, II, III and IV to be energized in descending sequence. In other words, the counter progresses step by step for each discrete pulse that is received at the input 5. As can best be seen in FIG. 2, the pulses applied to the input 1 are amplified in a two-stage resistance coupled amplifier 10 comprising the transistors TA and TB connected in a common emitter configuration and providing an output via the condenser C9, which output is applied to the transistor trigger circuit 20 comprising the transistors T1 and T2 connected to form a mono-stable multivibrator circuit, the transistor T1 being normally conductive. The input 5 is connected to a similar preamplifier 15 comprising transistors TC and TD connected in a common emitter configuration and likewise supplying an output puse to a mono-stable multivibrator 25 comprising the transistors T5 and T6. The output from the amplifier 15 to the mono-stable multivibrator 25 is by way of the condenser C10. The transistors mentioned thus far are all PNP type and therefore their collectors are returned to a source of negative voltage from the battery E in FIG. 3 via the terminal *a*. The input pulses of positive polarity and therefore the pulse appearing at C9 or C10, depending on which input is energized by a pulse, is also oriented in the positive direction. The two mono-stable multivibrators 20 and 25 are identical and the transistors T1 and T5 thereof are both biased forwardly so that the transistors T2 and T6 are cut off. Whenever a positive pulse is applied to either the transistor T1 or T5 via the condensers C9 or C10, respectively, the positive pulse cuts the transistor off and thereby renders the other transistor T2 or T6 conductive. The transistor T2, if rendered conductive by a pulse received through the condenser C9, remains conductive only for a brief interim of time, as determined by the time constant R18, R20 and C12, and then the transistor T2 is again cut off and the multivibrator returns to its stable condition of conductivity in which the transistor T1 is conductive. The same thing happens when the transistor T5 is cut off by a pulse through the condenser C10. The transistor T6 then becomes conductive for a brief interval of time but remains conductive only for the duration of the time constant formed by C14, R26 and R24, and then the multivibrator returns to its stable condition of conductivity, in which T5 is conductive and T6 is cut off.

When T1 is cut off by a pulse arriving through C9 a negative pulse is delivered at terminal $f$. Likewise, whenever the transistor T5 is cut off by the arrival of a pulse from C10 a negative pulse is delivered at terminal $d$. At the same time, since the multivibrator 20 or 25 briefly changes its condition of conductivity, a positive pulse is delivered at terminal $c$ by transistor T2 and a positive pulse is delivered at terminal $b$ by transistor T6, these pulses being differentiated by the capacitors C16 and C15 respectively taken with the resistance R27.

Therefore, the arrival of a pulse at the input 1 causes the delivering of a positive pulse to the terminal $c$ and a negative pulse to the terminal $f$. Likewise, whenever a pulse is received at the input 5 there results the delivery of a positive pulse at the terminal $b$, and a negative pulse at the terminal $d$. In this manner, the mono-stable multivibrators 20 and 25 are employed to assure the sharpness of the pulses received at the inputs 1 and 5 and to render them all substantially the same amplitude.

Referring now particularly to the circuit shown in FIG. 3, these pulses have been illustrated again at the corresponding terminals $b$, $c$, $d$ and $f$, and the manner in which they are applied to the bi-stable multivibrator 30 and to the forward and reverse coincidence circuits 40 and 50, respectively, will be discussed in connection with this latter figure. The bi-stable multivibrator 30 comprises transistors 3 and 4 having their emitters connected together and returned to ground through a self-biasing circuit R33 and C19. The collectors of the transistors T3 and T4 are returned to the negative terminal of the battery E through resistances R28 and R29 respectively. The base of the transistor T3 is coupled to the collector of the transistor T4 through R30 and C17, and the base of the transistor T4 is coupled to the collector of the transistor T3 through R31 and C18. Therefore, the multivibrator 30 is entirely symmetrical and is stable in either of these conditions of conductivity.

As stated aove, whenever a pulse is received at the input 1 a differentiated positive pulse will be delivered at terminal $c$ and this pulse will be applied through the diode D1 to the base of the transistor T3, the diode blocking the negative spike of the differentiated pulse. Similarly, if a pulse is received at the input 5 a differentiated positive pulse will appear at terminal $b$ and this pulse will be applied to the base of the transistor T4 by the diode D2. These differentiated pulses are applied to the bases of the transistors T3 and T4 in order to effect reversal of the condition of conductivity thereof each time a pulse is received at either of the inputs, and it is to be noted that the terminals $b$ and $c$ are mutually connected together in FIG. 3A. The multivibrator 30 delivers output pulses at terminals G and J, which pulses are supplied to one set of input terminals of the forward coincidence circuit 40 and the reverse coincidence circuit 50. Each of these circuits comprises two transistors connected in series and having a load resistance connecting them to the source of negative supply potential. The coincidence circuit 40 comprises two PNP transistors returned to the source of potential through the resistance R38; both of the transistors T11 and T12 normally having no forward bias so that neither is conductive. Transistor T12 is biased forwardly whenever a negative pulse is applied to its base through condenser C23 from terminal $f$. Transistor T11 is biased forwardly whenever a negative pulse is applied to its base through the condenser C20 from terminal J. If both transistors T11 and T12 are simultaneously biased in the forward direction, current will flow through resistance R38, which will have the effect of generating a positive pulse which will be applied to the base of transistor T10 of the second multivibrator 60 through the diode D4.

Similarly, in the coincidence circuit 50, transistors T7 and T8 are connected in series with the resistance R37 across the voltage supply E and the transistor T8 will be rendered conductive only when a negative pulse is applied to its base via C22 from the terminal $d$. Transistor T7 will be rendered conductive only when a negative pulse is applied through condenser C21 to the base of the transistor from the terminal G. If both transistors T7 and T8 are rendered simultaneously conductive a positive pulse is generated at the collector of transistor T8 and this pulse is applied through the diode D3 to the base of transistor T9 in the second bi-stable multivibrator circuit 60.

As stated above, the multivibrator 30 is reversed every time a pulse is received at either input. However, only every alternate pulse received operates a coincidence circuit, and therefore the multivibrator 60 has its condition of conductivity reversed only every other time a pulse is received at one of the inputs. Whenever the terminal G is positive the coincidence circuit 50 cannot deliver a positive pulse. Likewise, whenever the terminal J is positive the coincidence circuit 40 cannot deliver a positive pulse. Whenever there is no negative pulse at terminal $d$, coincidence circuit 50 cannot deliver a positive pulse, and whenever there is no negative pulse at terminal $f$ coincidence circuit 40 cannot deliver a positive pulse.

By reference to the block diagram of FIG. 1, the manner of operation can be illustrated as follows. If pulses are being received only at the input 1, only the forward coincidence circuit 40 receives pulses enabling it to operate, and the reverse coincidence circuit 50 is inoperative. Therefore, every time a pulse is delivered by the forward trigger unit 20, the forward coincidence circuit is biased forwardly at one terminal and the bi-stable multivibrator 30 has its condition of conductivity reversed. Every other time of reversal, the pulse delivered to the coincidence circuit through condenser C20 will have the correct polarity to operate the forward coincidence circuit 40. When this forward coincidence circuit is operated, it delivers a pulse through condenser C24, which pulse then reverses the polarity of the bi-stable multivibrator 60. Since the forward coincidence circuit 40 is biased forwardly by the bi-stable multivibrator 30 only every other time the latter reverses, the bi-stable multivibrator 60 will operate once for every two operations of the multivibrator 30.

Similarly, whenever signal pulses are received at the input 5, the reverse trigger unit 25 will bias the reverse coincidence circuit 50 forwardly, but the bi-stable multivibrator 30 will forwardly bias this reverse coincidence circuit 50 only on every other pulse. Therefore, only on every other reversal of the multivibrator 30 will the multivibrator 60 be reversed.

The D.C. switches 70, 80, 110, 120, 130 and 140 each comprise an NPN transistor which is either cut off or rendered conductive by the action of the multivibrators thereon. The switch 70 comprising the transistor T13, FIG. 3, is conductive whenever terminal G of transistor T3 is positive. Likewise, the switch 80 comprising the transistor T18 is conductive only whenever the terminal J of the transistor T4 goes positive. Thus, since terminals G and J are alternately of positive-pulse polarity, only switch 70 or 80 would be conductive at one time, never both at once. When T13 is conductive it serves as a connection for the collectors of transistors T14 and T15 at terminal L to the positive terminal of the source E. Thus, when the terminal G goes positive, the transistors T14 and T15 have their collectors connected by the switch 70 to the source of positive voltage. Likewise, whenever the terminal J goes positive, the transistors T16 and T17 have their collectors connected to the source of positive voltage E by the switch 80 at the terminal N. By thus interconnecting the collectors of transistors T14 and T15 at L and interconnecting the collectors of transistors T16 and T17 at N, control may be had of the conductivity of these transistors.

However, the conductivity of these transistors is also controlled by the bias applied to their bases, and for this purpose transistors T14 and T16 are rendered conductive at terminal Z, while at the same time transistors T15 and T17 remain nonconductive since their bases are biased negative at terminal F. Alternately, when terminal F goes positive, transistors T15 and T17 have their bases forward biased and transistors T14 and T16 have their bases cut off of terminal Z, and therefore only transistors T14 and T17 could be conductive.

Thus, transistor T14 is conductive whenever terminal G of multivibrator 30 goes positive, and terminal Z of multivibrator 60 goes positive. Transistor T16 representing terminal II is conductive whenever terminal J of multivibrator 30 is going positive and terminal Z of multivibrator 60 goes positive, thereby rendering terminal III conductive. Finally, transistor T17 is conductive only when terminal J of multivibrator 30 goes positive and terminal F of multivibrator 60 goes positive. These four conditions represent the four possible permutations of conductivity of the two multivibrators 30 and 60.

A continuous succession of pulses applied to the input 1 causes conductivity to be shifted among terminals I, II, III and IV in forward counting sequence, i.e. I–II–III–IV–I–II–III . . . and a continuous succession of pulses applied to the input 5 causes the four output terminals to count in reverse order, i.e. IV–III–II–I–IV–III–II–I . . . .

Only one of the four terminals marked in Roman numerals can be conductive at any one time, and this conductivity is transferred from one terminal to the next terminal in the correct sequence each time a pulse is received at one of the inputs. By this means, the windings 310, 320, 330 and 340 shown in FIG. 4 are energized in correct sequence and the shaft 3a of the stepping motor 3 is rotated by one-quarter of a pole every time a pulse is received at one of the transducers.

The components of the electronic circuit have been marked, and a parts list of circuit components is provided hereinafter for the purpose of illustrating a practical embodiment of the invention.

The circuit values for the practical embodiment of the circuit are as follows:

R1, R5, R8, R12, R27, R41 are 100,000 ohms.
R2, R9, R20, R26, R30, R31, R46, R47, R50, R51 are 15,000 ohms.
R3, R6, R10, R13, R16, R17, R22, R23 are 10,000 ohms.
R4, R11, R28, R29, R32, R34, R42, R44, R45, R48 are 4,700 ohms.
R7, R14 are 2,200 ohms.
R15, R21 are 68,000 ohms.
R18, R24 are 22,000 ohms.
R19, R25, R56, R57, R58, R59 are 2,700 ohms.
R33 is 650 ohms.
R35, R36, R37, R38, R39, R40, R52, R53, R54, R55 are 27,000 ohms.
R43 is 1,000 ohms.
R49 is 330 ohms.
C1, C3, C5, C7, C9, C10 are 5 microfarads, electrolytic.
C2, C4, C6, C8 are 10 microfarads, electrolytic.
C11, C13, C28 are .01 microfarad.
C12, C14, C15, C16, C17, C18, C26, C27 are 330 microfarads.
C19 is .1 microfarad.
C20, C21, C22, C23 are 500 micromicrofarads.
C24, C25 are 100 micromicrofarads.
TA and TC are 2N402 (PNP).
TB and TD are 2N403 (PNP).
T1–T12 inclusive are 2N368 (PNP).
T13–T18 inclusive are 2N214 (NPN).
D1–D4 inclusive are 1N64A.
Battery E is 18 volts.

This invention is not to be limited to the exact form shown in the drawings for obviously changes may be made, such as using a motor circuit having a different number of windings and a different counter circuit having a different number of output terminals. Also other reversible binary counter circuits can be used in place of the one shown. These and other changes are contemplated within the scope of the following claims.

What is claimed is:

1. A system for converting electrical input pulses into incremental mechanical motions, comprising input means receiving said pulses one at a time; mechanical actuator means having terminals which when energized in sequence cause the actuator to move through one increment per pulse; electronic counter means connected to said input means and receiving said pulses, said counter means having output terminals connected to said mechanical actuator terminals and energized by the counter in sequence for each of said input pulses, switch means comprising a power transistor connected between each winding and said power source and each coupled to one output terminal of the counter means; a resistance connected in series with each winding for limiting the current therethrough, said power being unidirectional; and a condenser connected in circuit to the power source and to the resistance and providing with the resistance an RC time constant which places substantially the full source voltage across the winding when the transistor is first rendered conductive, and this voltage decaying with time to a smaller steady-state value.

2. A system for converting electrical input pulses into incremental mechanical motions, comprising input means receiving said pulses one at a time; mechanical actuator means having terminals which when energized in sequence cause the actuator to move through one increment per pulse; electronic counter means connected to said input means and receiving said pulses, said counter means having output terminals connected to said mechanical actuator terminals and energized by the counter in sequence for each of said input pulses, actuator including a stepping motor having a plurality of windings for rotating the motor by one step each time energization is transferred from one winding to the next winding in sequence; and said counter means having two separate binary inputs alternatively receiving said forward-motion and reverse-motion pulses, a plurality of multivibrators forming said counter and each capable of two conditions of conductivity, the total number of permutations of conductivity at least equaling the number of motor windings; forward and reverse coincidence circuits joining said multivibrators via different paths and connected to the transducers to be activated by forward-motion and reverse-motion pulses, respectively, to control the direction of the sequence of counting; a source of power; and switch means connected between each winding and said source and each responsive to a different one of said permutations of conductivity whereby said windings are energized one-by-one.

3. In a system as set forth in claim 2, each of said switch means comprising a power transistor connected between each winding and said power source; a resistance connected in series with each winding circuit for limiting the current therethrough, said power being unidirectional;

and a condenser connected in the circuit to the power source and to the resistance and providing with the resistance an RC time constant which places substantially the full source voltage across the winding when the transistor is first rendered conductive, and this voltage decaying with time to a smaller steady-state value.

4. In a system as set forth in claim 2, said counter means having two multivibrators each including two outputs and said motor having four windings; and power transistor control means comprising in each case an electronic valve means in control of the transistor, each valve means having two control electrodes each controlled by a different multivibrator output and each valve means being controlled by a different combination of multivibrator outputs.

5. The combination of a stepping motor having sequential stepping windings; a source of power; a coupling circuit selectively connecting each of said windings to said source; commutating means for selecting one of said coupling circuits at a time; and pulse receiving means connected to advance said commutating means each time said receiving means is pulsed, each of said coupling circuits comprising a power transistor connected between a winding and said power source; a resistance connected in series with each winding circuit for limiting the current therethrough, said power being unidirectional; and a condenser connected in the circuit to the power source and to the resistance and providing with the resistance an RC time constant which places substantially the full source voltage across the winding when the transistor is first rendered conductive, and this voltage decaying with time to a smaller steady-state value.

6. The combination of a stepping motor having sequential stepping windings; a source of power; a coupling circuit selectively connecting each of said windings to said source; commutating means for selecting one of said coupling circuits at a time; pulse receiving means having two inputs for alternatively receiving forward-motion pulses and reverse-motion pulses, said commutator means comprising a reversible counter connected to said pulse receiving means and advanced forwardly by a forward-motion pulse and reversely by a reverse-motion pulse, and said counter comprising a plurality of multivibrators each capable of two conditions of conductivity, the total number of permutations of conductivity at least equaling the number of motor windings; forward and reverse coincidence circuits joining said multivibrators via different paths and connected to the inputs to be activated by forward-motion and reverse-motion pulses, respectively, to control the direction of the sequence of counting; and said coupling circuit comprising switch means connected between each winding and said source and each responsive to a different one of said permutations of conductivity whereby said windings are energized one-by-one.

7. In a combination as set forth in claim 6, each of said switch means comprising a power transistor connected between each winding and said power source; a resistance connected in series with each winding circuit for limiting the current therethrough, said power being unidirectional; and a condenser connected in the circuit to the power source and to the resistance and providing with the resistance an RC time constant which places substantially the full source voltage across the winding when the transistor is first rendered conductive, and this voltage decaying with time to a smaller steady-state value.

8. In a combination as set forth in claim 7, said counter means having two multivibrators each including two outputs and said motor having four windings; and power transistor control means comprising in each case an electronic valve means in control of the transistor, each valve means having two control electrodes each controlled by a different multivibrator output and each valve means being controlled by a different combination of multivibrator outputs.

9. In a system for converting electrical input pulses into incremental mechanical motions, in combination,
a plurality of normally open electronic switches having outputs for connection to incremental mechanical motion imparting means, in which the switches are arranged for sequential operation;
flip-flop means for successively closing sequentially adjacent pairs of said switches;
signal input means including flip-flop means for sequentially applying mechanical motion signals to pairs of said switches, in which each such pair comprises one of said switches closed by the first mentioned flip-flop means and an open switch removed two in sequence from such one closed switch;
forward trigger means and reverse trigger means adapted to alter the stable state condition of the second mentioned flip-flop means;
forward coincidence means connected to said forward trigger means and to the second flip-flop means for triggering the first flip-flop means upon simultaneous signal reception from the forward trigger means and the second flip-flop means; and
reverse coincidence means connected to said reverse trigger means and to the second flip-flop means for triggering the first flip-flop means upon simultaneous signal reception from the reverse trigger means and the second flip-flop means.

10. In a system for converting electrical input pulses into incremental mechanical motions, in combination,
first and second pairs of normally open electronic switches having outputs for connection to incremental mechanical motion imparting means, in which the outputs of each pair are arranged for sequential operation;
first flip-flop means having its output for one stable state connected to the first pair of switches to actuate the same and its output for the other stable state connected to the other pair of switches, for actuation thereof;
second flip-flop means for sequentially applying motion imparting signals to pairs of said switches in which each such pair comprises one switch of said first pair and one switch of said second pair removed two in sequence therefrom;
forward trigger means adapted to trigger the second flip-flop means from one stable state to the other;
reverse trigger means adapted to trigger the second flip-flop means from one stable state to the other;
forward coincidence means connected to said forward trigger means and to one stable state output of the second flip-flop means for triggering the first flip-flop means from one stable state to the other upon simultaneous signal reception from the forward trigger means and the second flip-flop means; and
reverse coincidence means connected to said reverse trigger means and to the other stable state output of the second flip-flop means for triggering the first flip-flop means from one stable state to the other upon simultaneous signal reception from the reverse trigger means and the second flip-flop means.

11. In a system for converting electrical input pulses into incremental mechanical motions, in combination,
first and second pairs of normally open electronic switches having outputs for connection to incremental mechanical motion imparting means, in which the outputs of each pair are arranged for sequential operation;
first flip-flop means having its output for one stable state connected to the first pair of switches to actuate the same and its output for the other stable state connected to the other pair of switches, for actuation thereof;
a third pair of electronic switches, one of which has an output connected to one switch of each pair and the other of which has an output connected to the other switch of each pair;
second flip-flop means for alternately actuating said third pair of switches;
forward trigger means adapted to trigger the second flip-flop means from one stable state to the other;
reverse trigger means adapted to trigger the second flip-flop means from one stable state to the other;
forward coincidence means connected to said forward trigger means and to one stable state output of the second flip-flop means for triggering the first flip-flop means from one stable state ot the other upon simultaneous signal reception from the forward trigger means and the second flip-flop means; and
reverse coincidence means connected to said reverse trigger means and to the other stable state output of the second flip-flop means for triggering the first flip-flop means from one stable state to the other upon simultaneous signal reception from the reverse trigger means and the second flip-flop means.

References Cited in the file of this patent

UNITED STATES PATENTS

| | | |
|---|---|---|
| 2,706,270 | Steele | Apr. 12, 1955 |
| 2,750,548 | Van Dalen | June 12, 1956 |
| 2,774,026 | Towner | Dec. 11, 1956 |
| 2,922,095 | Hesse et al. | Jan. 19, 1960 |
| 3,024,399 | Valentino | Mar. 6, 1962 |

UNITED STATES PATENT OFFICE

CERTIFICATE OF CORRECTION

Patent No. 3,124,732                           March 10, 1964

Olin L. Dupy

It is hereby certified that error appears in the above numbered patent requiring correction and that the said Letters Patent should read as corrected below.

Column 2, line 44, for "Th" read -- The --; column 4, line 60, for "puse" read -- pulse --; column 8, line 51, after "pulses," insert -- said --; column 11, line 12, for "ot" read -- to --.

Signed and sealed this 7th day of July 1964.

(SEAL)
Attest:

ERNEST W. SWIDER
Attesting Officer

EDWARD J. BRENNER
Commissioner of Patents